(12) United States Patent
Fukuhara

(10) Patent No.: US 11,565,328 B2
(45) Date of Patent: Jan. 31, 2023

(54) CUTTING INSERT, CUTTING TOOL, AND METHOD FOR MANUFACTURING MACHINED PRODUCT

(71) Applicant: KYOCERA Corporation, Kyoto (JP)

(72) Inventor: Yousuke Fukuhara, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 99 days.

(21) Appl. No.: 17/252,049

(22) PCT Filed: Jun. 27, 2019

(86) PCT No.: PCT/JP2019/025654
§ 371 (c)(1),
(2) Date: Dec. 14, 2020

(87) PCT Pub. No.: WO2020/009002
PCT Pub. Date: Jan. 9, 2020

(65) Prior Publication Data
US 2021/0260669 A1    Aug. 26, 2021

(30) Foreign Application Priority Data

Jul. 6, 2018    (JP) .............................. JP2018-128979

(51) Int. Cl.
*B23B 27/16* (2006.01)
*B23B 27/04* (2006.01)
*B23B 27/22* (2006.01)
*B23B 1/00* (2006.01)

(52) U.S. Cl.
CPC ............ *B23B 27/1611* (2013.01); *B23B 1/00* (2013.01); *B23B 27/045* (2013.01); *B23B 27/22* (2013.01);
(Continued)

(58) Field of Classification Search
CPC ............ B23B 2200/321; B23B 27/045; B23B 27/1611; B23B 27/1614; B23B 1/00;
(Continued)

(56) References Cited

U.S. PATENT DOCUMENTS

| 4,969,779 A * | 11/1990 | Barten | B23B 27/045 407/115 |
| 5,511,911 A * | 4/1996 | Katbi | B23B 27/045 407/116 |

(Continued)

FOREIGN PATENT DOCUMENTS

| CN | 101698243 A | 4/2010 |
| JP | 02-106204 A | 4/1990 |

(Continued)

*Primary Examiner* — Sara Addisu
(74) *Attorney, Agent, or Firm* — Volpe Koenig

(57) ABSTRACT

A cutting insert may include a base and a cutting part. The cutting part may include an upper surface, a first cutting edge and a second cutting edge. The first cutting edge may be located on a first ridgeline. The second cutting edge may be located on a second ridgeline. The upper surface may include a first inclined surface, protrusions and a first upheaved part. The first inclined surface may be located along the first ridgeline. The protrusions may be located side by side in a direction along the first ridgeline on the first inclined surface. The first upheaved part may be located at a side further away from the first ridgeline than the pair of protrusions. The second cutting edge may be inclined downward. An upper end of the first upheaved part may be located above the second cutting edge.

18 Claims, 20 Drawing Sheets

(52) U.S. Cl.
CPC ... *B23B 2200/081* (2013.01); *B23B 2200/321* (2013.01)

(58) Field of Classification Search
CPC ... B23B 27/22; B23B 2200/32; B23B 27/143; B23B 5/14; B23B 2200/081; B23B 27/04; B23B 2200/323
See application file for complete search history.

(56) References Cited

U.S. PATENT DOCUMENTS

| | | | | |
|---|---|---|---|---|
| 5,676,495 | A | 10/1997 | Katbi et al. | |
| 5,725,334 | A * | 3/1998 | Paya | B23B 27/065 407/104 |
| 9,925,595 | B2 * | 3/2018 | Tsuda | B23B 27/045 |
| 10,569,336 | B2 * | 2/2020 | Kusuda | B23B 27/045 |
| 2006/0269367 | A1 * | 11/2006 | Havrda | B23B 27/045 407/117 |
| 2015/0158089 | A1 | 6/2015 | Inoue | |
| 2019/0262907 | A1 | 8/2019 | Kusuda | |
| 2022/0176461 | A1 * | 6/2022 | Yamamoto | B23B 27/045 |

FOREIGN PATENT DOCUMENTS

| | | | | |
|---|---|---|---|---|
| JP | 08-168902 | A | 7/1996 | |
| JP | 2014-161996 | A | 9/2014 | |
| WO | 2014/003161 | A1 | 1/2014 | |
| WO | 2018/079491 | A1 | 5/2018 | |
| WO | WO-2020203414 | A1 * | 10/2020 | ........... B23B 27/045 |

* cited by examiner

CUTTING INSERT, CUTTING TOOL, AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2019/025654, filed on Jun. 27, 2019, which claims priority to Japanese Application No. 2018-128979, filed on Jul. 6, 2018, which are entirely incorporated herein by reference.

TECHNICAL FIELD

The present disclose relates to cutting inserts for use in a cutting process.

BACKGROUND

For example, a cutting tip is discussed in Japanese Unexamined Patent Application Publication No. 2-106204 (Patent Document 1) and may be used for a turning process of a workpiece, such as metal. The tip discussed in Patent Document 1 may be usable for a grooving process and a cutting-off process. The tip discussed in Patent Document 1 may include a main cutting edge, sub cutting edges respectively located on both sides of the main cutting edge, a rake surface located along the main cutting edge and the sub cutting edges, and a protruding breaker located in the rake surface. The protruding breaker may be formed by a central protrusion and lateral protrusions.

SUMMARY

A cutting insert in non-limiting aspects of the present disclosure may include a base and a cutting part. The base may include an upper side surface and a lower side surface. The cutting part may be protruded from the base toward a first end. The cutting part may include an upper surface, a first lateral surface, a second lateral surface, a third lateral surface, a first ridgeline, a second ridgeline, a third ridgeline, a first cutting edge and a second cutting edge. The upper surface may be extended from the upper side surface toward the first end. The first lateral surface may be located at a side of the first end and adjacent to the upper surface. The second lateral surface may be adjacent to the first lateral surface and the upper surface. The third lateral surface may be adjacent to the first lateral surface and the upper surface, and may be located at a side opposite to the second lateral surface. The first ridgeline may be located on an intersection of the upper surface and the first lateral surface. The second ridgeline may be located on an intersection of the upper surface and the second lateral surface. The third ridgeline may be located on an intersection of the upper surface and the third lateral surface. The first cutting edge may be located on the first ridgeline. The second cutting edge may be located on the second ridgeline.

The upper surface may include a first inclined surface, a pair of protrusions and a first upheaved part. The first inclined surface may be located along the first ridgeline and inclined downward as going away from the first ridgeline. The pair of protrusions may be located side by side in a direction along the first ridgeline on the first inclined surface. The first upheaved part may be located along the third ridgeline at a side further away from the first ridgeline than the pair of protrusions. The second cutting edge may be inclined downward as going away from the first ridgeline. An upper end of the first upheaved part may be located above the second cutting edge.

EMBODIMENTS

Figure 1:
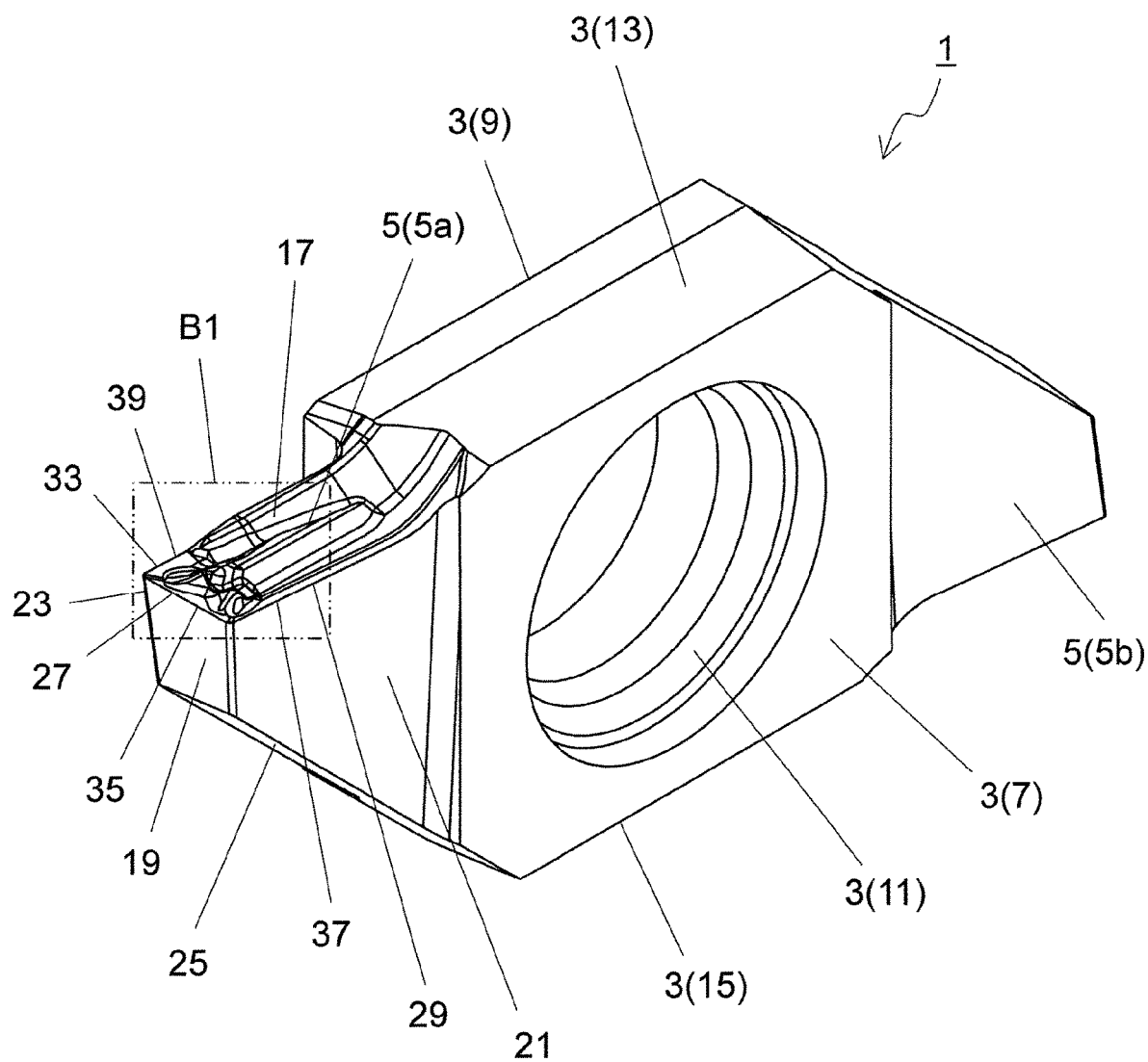
FIG. 1 is a perspective view illustrating a cutting insert in non-limiting aspects of the present disclosure.

There has been a desire that the tip (cutting insert) for use in the grooving process and the cutting-off process is also usable, besides these processes, for a process in which a direction along a main cutting edge is a feed direction, such as a traversing process. The tip discussed in Patent Document 1 may be insufficient in chip discharge performance in the process in which the direction along the main cutting edge is the feed direction. Hence there has been the desire that the tip is also usable for the process in which the direction along the main cutting edge is the feed direction.

<Inserts>

The cutting insert 1 in non-limiting embodiments may be described in detail below with reference to the drawings. Hereinafter, the cutting insert 1 may also be referred to simply as "the insert 1." For the sake of description, the drawings referred to in the following may illustrate, in simplified form, only main members necessary for describing the non-limiting embodiments. The cutting insert 1 may therefore be capable of including any arbitrary structural member not illustrated in the drawings referred to. Dimensions of the members in each of the drawings may faithfully represent neither dimensions of actual structural members nor dimensional ratios of these members.

The insert 1 in the non-limiting embodiments may include a base 3 and a cutting part 5 as illustrated in FIG. 1 or the like. The base 3 may be used as a part to be constrained by a holder when attaching the insert 1 to the holder.

The cutting part 5 may be a part brought into contact with a workpiece during a cutting process of the workpiece, and may be used as a part that fulfils a main role in the cutting process. One or more cutting parts 5 may be included. The insert 1 may include two cutting parts 5 as in the non-limiting embodiment illustrated in FIG. 1.

A shape of the base 3 is not limited to a specific configuration. The base 3 may have, for example, a bar shape, polygonal plate shape or polygonal column shape. The base 3 may have a quadrangular plate shape as in the non-limiting embodiment illustrated in FIG. 1.

The base 3 may include a first main surface 7, a second main surface 9 and a through hole 11 as in the non-limiting embodiment illustrated in FIG. 1. As in a non-limiting embodiment illustrated in FIG. 3, the first main surface 7 may have a quadrangular shape. The second main surface 9 may be located on a side opposite to the first main surface 7, and may have a quadrangular shape similarly to the first main surface 7.

The through hole 11 may open into the first main surface 7 and the second main surface 9 as in the non-limiting embodiment illustrated in FIG. 1. The through hole 11 may open into a midportion of the first main surface 7 and a midportion of the second main surface 9.

The through hole 11 may be used for fixing the insert 1 to the holder. For example, when fixing the insert 1 to the holder, the insert 1 may be fixable to the holder by inserting a screw into the through hole 11.

The base 3 may include an upper side surface 13 and a lower side surface 15. The upper side surface 13 and the lower side surface 15 may be individual flat surfaces. The upper side surface 13 and the lower side surface 15 may be located parallel to each other in a longitudinal direction of the insert. The upper side surface 13 and the lower side surface 15 may form a part of a side part located between the first main surface 7 and the second main surface 9 in the base 3 as in the non-limiting embodiment illustrated in FIG. 1.

The upper side surface 13 in the base 3 of the non-limiting embodiment may be located so that the upper side surface 13 is an upper end in the insert 1 if the insert 1 is attached to the holder as described later. The lower side surface 15 in the base 3 of the non-limiting embodiment may be located so that the lower side surface 15 is a lower end in the insert 1 if the insert 1 is attached to the holder as described later.

Figure 2:
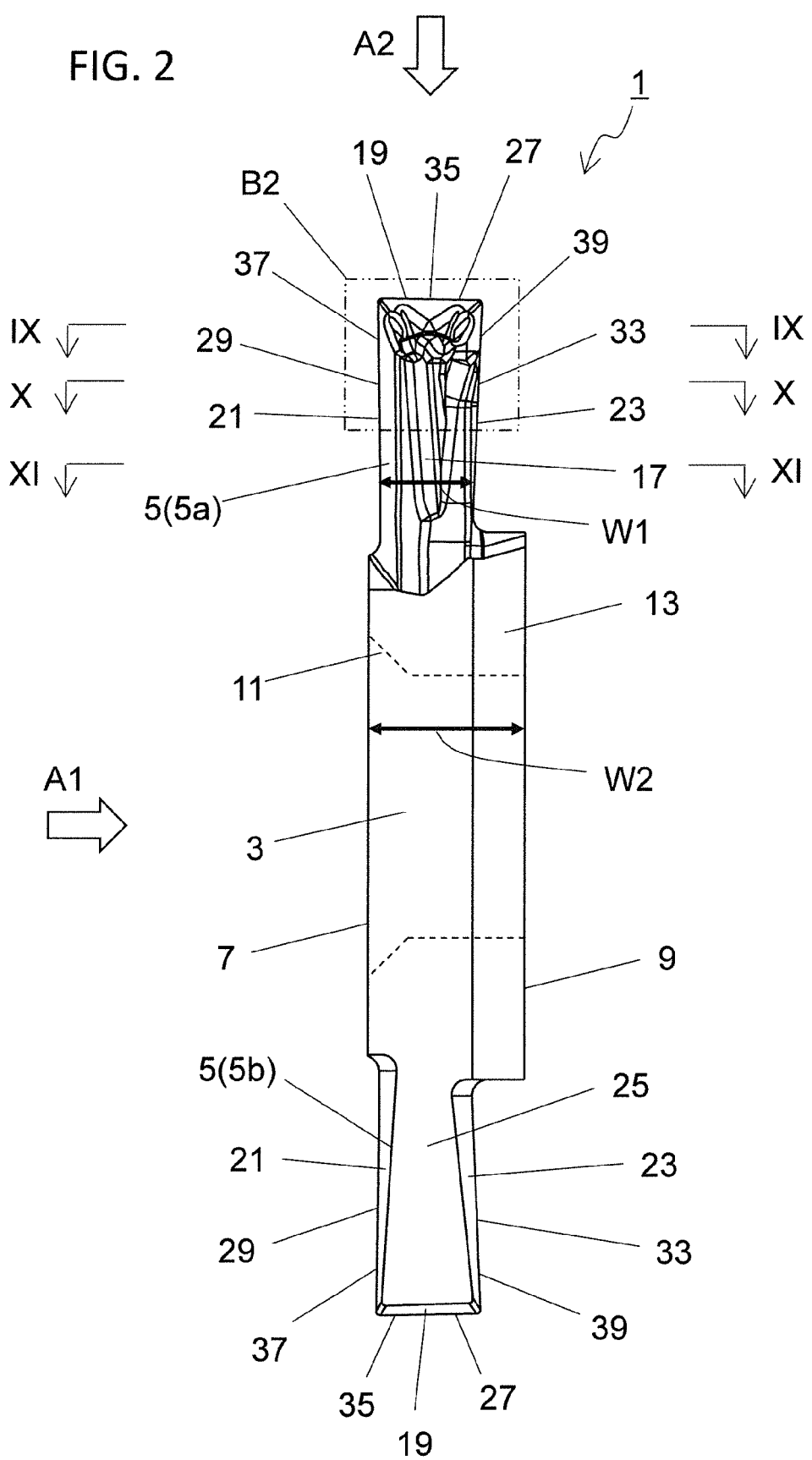
FIG. 2 is a front view of the cutting insert illustrated in FIG. 1 as viewed from a side of an upper surface.

A size of the base 3 is not particularly limited. A maximum width of the base 3 in a direction from the first main surface 7 toward the second main surface 9 (a lateral direction in FIG. 2) may be set to, for example, approximately 2.9-4.1 mm. A width of the base 3 in an extending direction of the base 3 (a lateral direction in FIG. 3) may be set to, for example, approximately 8-20 mm.

The insert 1 may include two cutting parts 5 as in the non-limiting embodiment illustrated in FIG. 1. Shapes of these two cutting parts 5 are not limited to a specific configuration. The cutting parts 5 may have, for example, a bar shape, polygonal plate shape or polygonal column shape. The shapes of the two cutting parts 5 may have a triangular plate shape as in the non-limiting embodiment illustrated in FIG. 3. The base 3 and the cutting parts 5 in the insert 1 may be formed individually or integrally.

A width W1 of the cutting part 5 in the direction from the first main surface 7 toward the second main surface 9 may be smaller than a width W2 of the base 3 in the direction from the first main surface 7 toward the second main surface 9. If the width W2 of the base 3 is relatively large, it may be easy to ensure a thickness of the base 3. This may facilitate to stably fix the insert 1 to the holder.

If the width W1 of the cutting part 5 is relatively small, this may ensure a high degree of freedom of machining width in a cutting process of a workpiece. If the base 3 and the cutting part 5 are different in width as described above, a region for the base 3 and a region for the cutting part 5 in the insert 1 may be divided by parts different in width.

Figure 3:
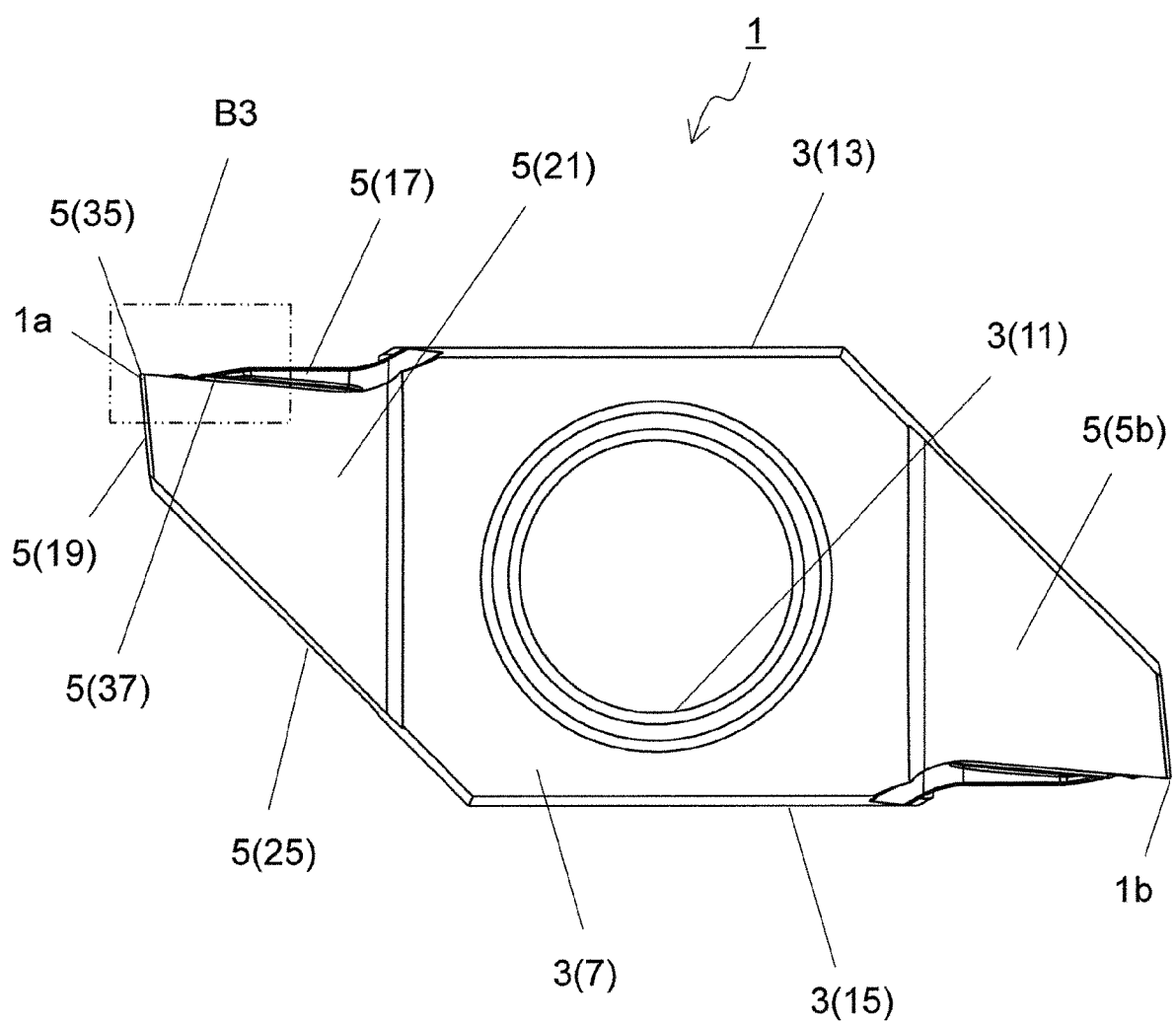
FIG. 3 is a side view of the cutting insert illustrated in FIG. 2 as viewed from an A1 direction.

One of the two cutting parts 5 may be a first cutting part 5a and the other may be a second cutting part 5b as in the non-limiting embodiment illustrated in FIG. 3. The first cutting part 5a and the second cutting part 5b may be individually protruded outward from the base 3. The first cutting part 5a may be protruded leftward from the base 3, and the second cutting part 5b may be protruded rightward from the base 3 in the non-limiting embodiment illustrated in FIG. 3.

Hereinafter, an end portion at a left side in the insert 1 where the first cutting part 5a is located may be a first end 1a, and an end portion at a right side in the insert 1 where the second cutting part 5b is located may be a second end 1b.

The first cutting part 5a and the second cutting part 5b may be protruded in directions opposite to each other. The first cutting part 5a and the second cutting part 5b may be located so as to have rotational symmetry around a central axis X1 of the through hole 11, and may have approximately the same configuration if the insert 1 is viewed from a side of the first main surface 7.

A configuration of the first cutting part 5a of the two cutting parts 5 which is protruded leftward from the base 3 may be described in detail below, while omitting a description of the second cutting part 5b of the two cutting parts 5 which is protruded rightward from the base 3.

Figure 4:
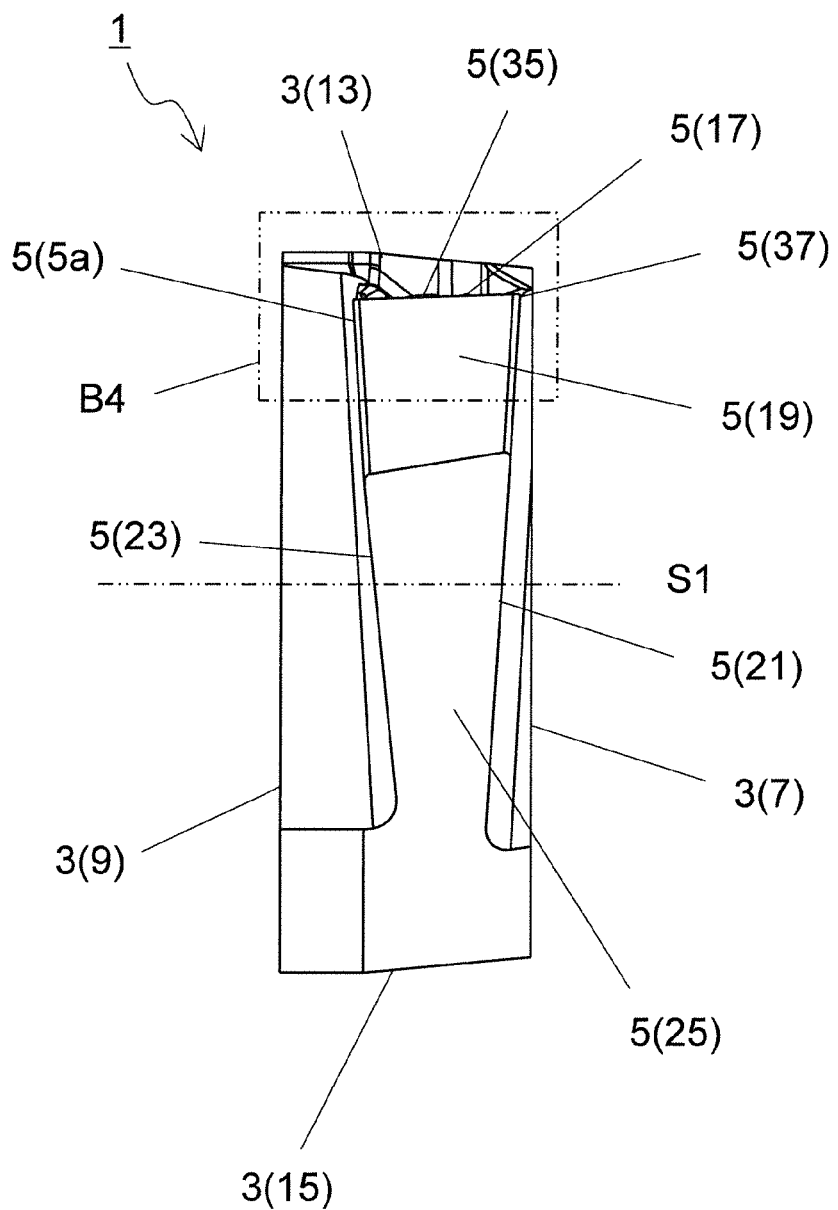
FIG. 4 is a side view of the cutting insert illustrated in FIG. 2 as viewed from an A2 direction.

The first cutting part 5a may include an upper surface 17, a first lateral surface 19, a second lateral surface 21, a third lateral surface 23 and a lower surface 25 as in a non-limiting embodiment illustrated in FIG. 4. The upper surface 17 may connect to the upper side surface 13 of the base 3, and may be protruded from the upper side surface 13 toward the first end 1a as in the non-limiting embodiment illustrated in FIG. 3.

The first lateral surface 19 may be located at a side of the first end 1a and may be adjacent to the upper surface 17 as in the non-limiting embodiment illustrated in FIG. 3. The second lateral surface 21 may be adjacent to the first lateral surface 19 and the upper surface 17 as in the non-limiting embodiment illustrated in FIG. 3. The second lateral surface 21 may connect to the first main surface of the base 3, and may be protruded from the first main surface 7 toward the first end 1a.

Figure 5:
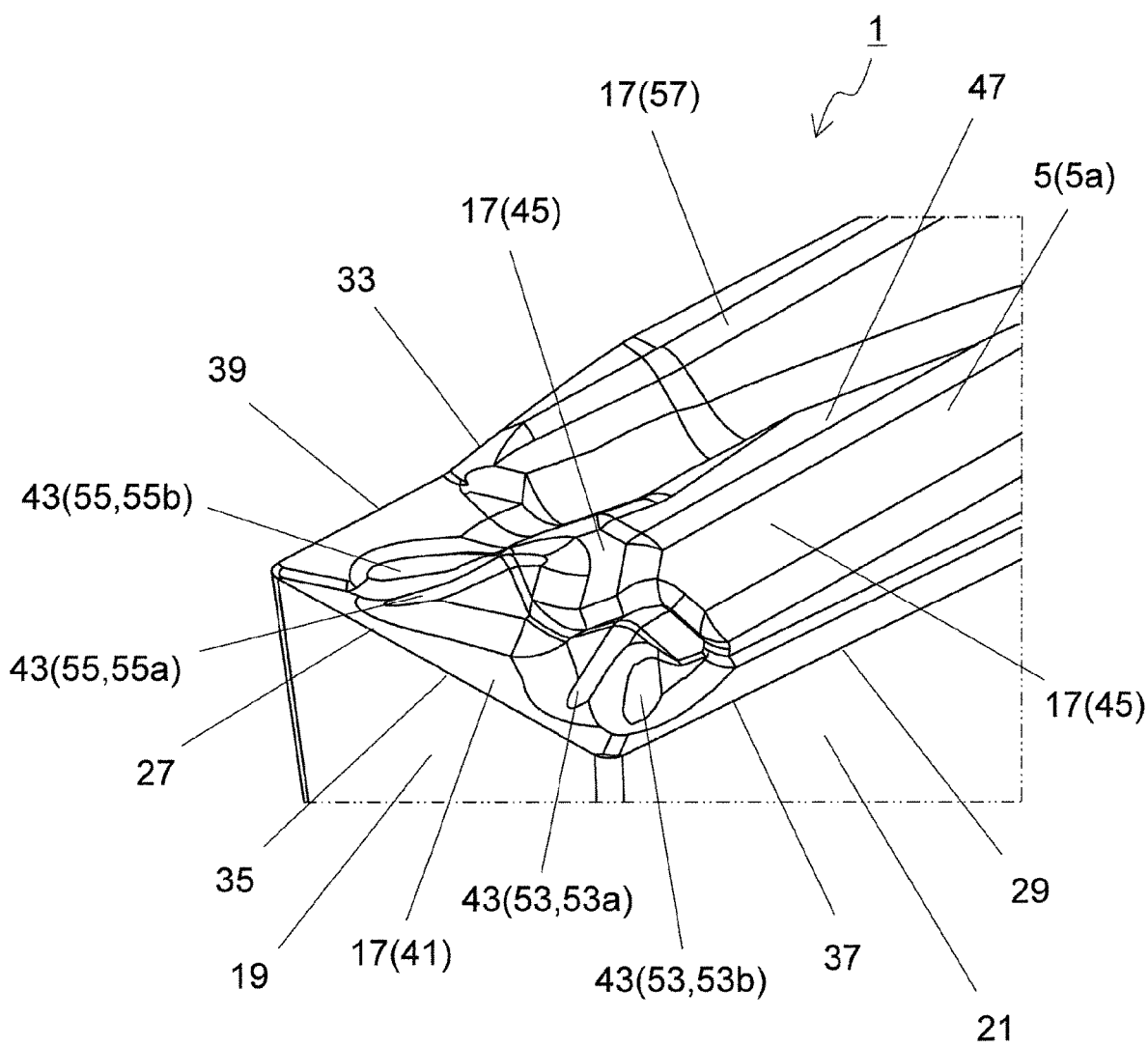
FIG. 5 is an enlarged view of a region B1 illustrated in FIG. 1.

The first lateral surface 19 and the second lateral surface 21 may have an approximately flat shape as in a non-limiting embodiment illustrated in FIG. 5. The first lateral surface 19 may directly connect to the second lateral surface 21. Alternatively, a curved surface connecting the first lateral surface 19 and the second lateral surface 21 may be located therebetween.

Figure 6:
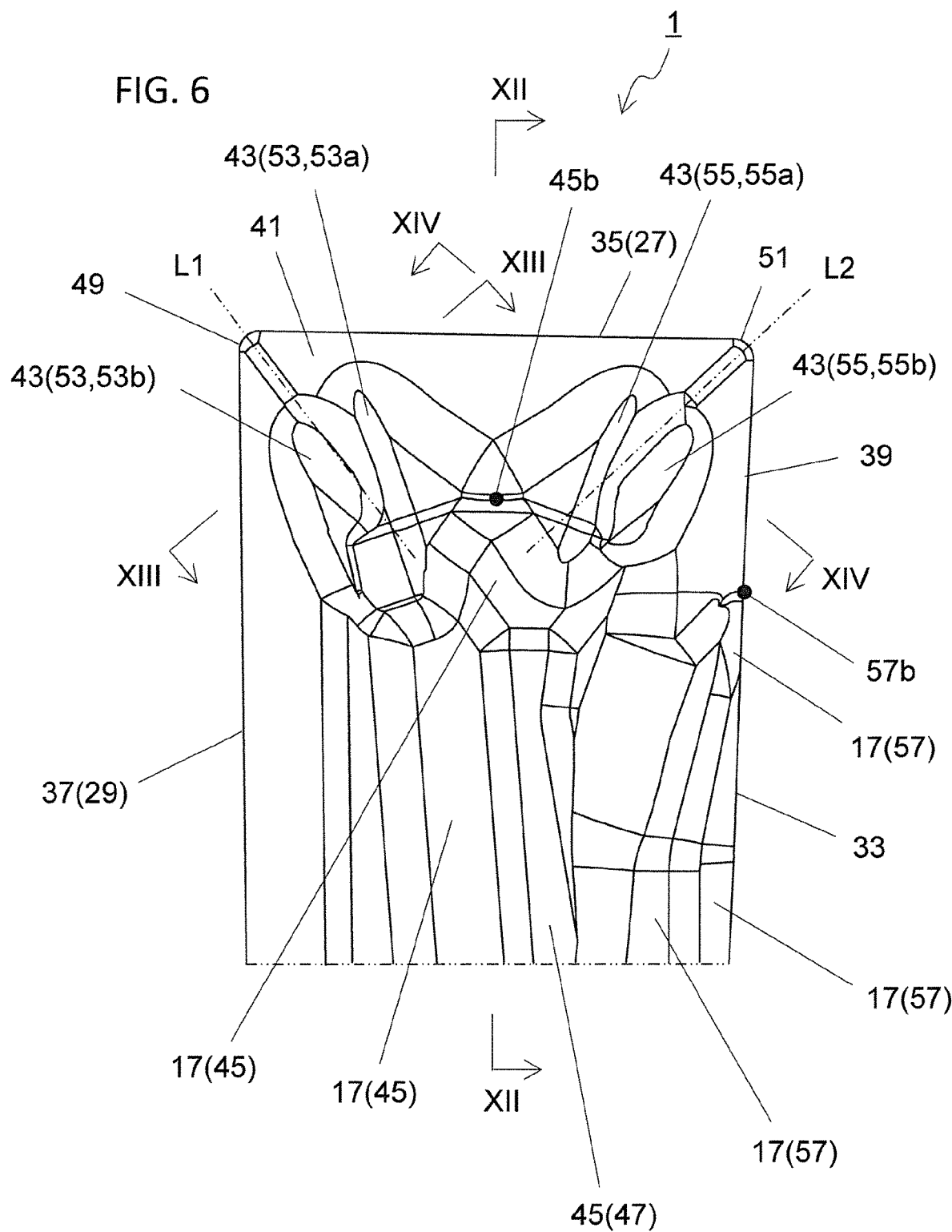
FIG. 6 is an enlarged view of a region B2 illustrated in FIG. 2.

The third lateral surface 23 may be adjacent to the first lateral surface 19 and the upper surface 17, and may be located on a side opposite to the second lateral surface 21 as in a non-limiting embodiment illustrated in FIG. 6. The third lateral surface 23 may connect to the second main surface 9 of the base 3, and may be protruded from the second main surface 9 toward the first end 1a. The third lateral surface 23 may have an approximately flat surface shape.

The lower surface 25 may be adjacent to the upper surface 17 by interposing therebetween the first lateral surface 19, the second lateral surface 21 and the third lateral surface 23 as in the non-limiting embodiment illustrated in FIG. 1. The lower surface 25 may connect to the lower side surface 15 of the base 3, and may be protruded from the lower side surface 15 toward the first end 1a.

The first cutting part 5a may include a first ridgeline 27, a second ridgeline 29 and a third ridgeline 33. The first ridgeline 27 may be located on an intersection of the upper surface 17 and the first lateral surface 19 as in the non-limiting embodiment illustrated in FIG. 2. The second ridgeline 29 may be located on an intersection of the upper surface 17 and the second lateral surface 21 as in the non-limiting embodiment illustrated in FIG. 2. The third ridgeline 33 may be located on an intersection of the upper surface 17 and the third lateral surface 23 as in the non-limiting embodiment illustrated in FIG. 2.

The first cutting part 5a may include a first cutting edge 35 and a second cutting edge 37. The first cutting edge 35 may be located on at least a part of the first ridgeline 27. For example, the first cutting edge 35 may be located on the whole or a part of the first ridgeline 27. The first cutting edge 35 may be located on the whole of the first ridgeline 27 in the non-limiting embodiment illustrated in FIG. 2.

The second cutting edge 37 may be located on at least a part of the second ridgeline 29. For example, the second cutting edge 37 may be located on the whole or a part of the second ridgeline 29. The second cutting edge 37 may be located on the part of the second ridgeline 29 in the non-limiting embodiment illustrated in FIG. 2.

The second cutting edge 37 may be located so as to include at least an end portion of the second ridgeline 29 which is located at a side of the first end 1a. In this case, the second cutting edge 37 may connect to the first cutting edge 35 in the non-limiting embodiment illustrated in FIG. 2. The first lateral surface 19 and the second lateral surface 21 may have an approximately flat surface shape, and the first cutting edge 35 and the second cutting edge 37 may have an approximately straight line shape as in the non-limiting embodiment illustrated in FIG. 5.

The first cutting edge 35 may be used as a cutting edge having a major role in, for example, the grooving process or cutting-off process. In this case, the second cutting edge 37 may be used as a cutting edge that assists the cutting process using the first cutting edge 35. Alternatively, the second cutting edge 37 may be used as a cutting edge having a major role in, for example, a traversing process. In this case, the first cutting edge 35 may be used as a cutting edge that assists the cutting process using the second cutting edge 37.

Figure 7:
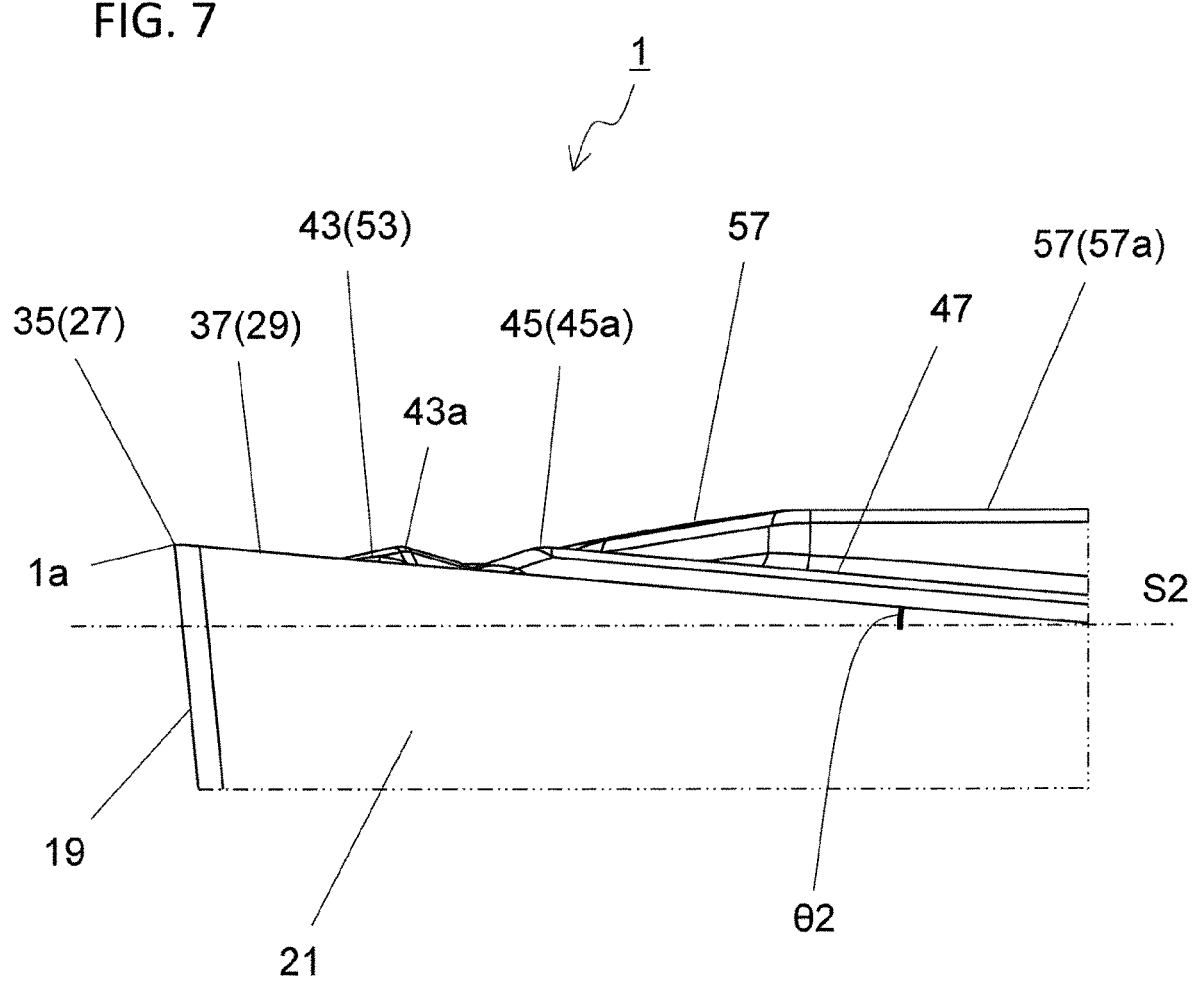
FIG. 7 is an enlarged view of a region B3 illustrated in FIG. 3.

The second cutting edge 37 may be inclined downward as going away from the first ridgeline 27 as in a non-limiting embodiment illustrated in FIG. 7. If the second cutting edge 37 has the above configuration, chips generated by the second cutting edge 37 may tend to flow in a direction away from the first end 1a. This may lead to enhanced chip discharge performance at the second end 1b.

The first cutting part 5a may further include a third cutting edge 39 located on at least a part of the third ridgeline 33. For example, the third cutting edge 39 may be located so as to include at least an end portion of the third ridgeline 33 which is located at a side of the first end 1a. If the third cutting edge 39 is located so, the third cutting edge 39 may connect to the first cutting edge 35.

If the third lateral surface 23 has the approximately flat surface shape, the third cutting edge 39 may have an approximately straight line shape. If the first cutting edge 35 is used as a cutting edge having a major role, the third cutting edge 39 may be used as a cutting edge that assists the cutting process using the first cutting edge 35.

Although the first lateral surface 19 and the second lateral surface 21 have the flat surface shape, the upper surface 17 may include a part having a concave-convex shape instead of the flat surface shape in the non-limiting embodiment. Specifically, the upper surface 17 may include a first inclined surface 41, a pair of protrusions 43 and a first upheaved part 45.

The first inclined surface 41 may be located along the first ridgeline 27 and inclined downward as going away from the first ridgeline 27. The first inclined surface 41 may serve as a so-called rake surface. For example, if the first inclined surface 41 serves as the rake surface, a chip flow direction may become stable by causing chips generated by the first cutting edge 35 to come into contact with the first inclined surface 41. The first inclined surface 41 may have a flat surface shape or curved surface shape. The first inclined surface 41 may have the flat surface shape in the non-limiting embodiment illustrated in FIG. 5.

The pair of protrusions 43 may be located side by side in a direction along the first ridgeline 27 on the first inclined surface 41. The protrusions 43 may serve as a so-called breaker protrusion. For example, if the pair of protrusions 43 serves as the breaker protrusion, chips generated by the first cutting edge 35 can be curved as viewed from a direction orthogonal to the first cutting edge 35 by causing the chips to come into contact with the pair of protrusions 43. This may contribute to stabilizing a chip flow direction.

The first upheaved part 45 may be located along the third ridgeline 33 at a side further away from the first ridgeline 27 than the pair of protrusions 43. The first upheaved part 45 may be located between the pair of protrusions 43 in a side view from a side of the first lateral surface 19. If the first upheaved part 45 is located as described above, chips that are generated by the first cutting edge 35 and pass through between the pair of protrusion 43 may tend to be curved at the first upheaved part 45. This may lead to enhanced chip discharge performance.

Specifically, an end portion 45b of the first upheaved part 45 which is located at a side of the first end 1a may be located between the pair of protrusions 43 as in a non-limiting embodiment illustrated in FIG. 6. In this case, the first upheaved part 45 may be located away from the third ridgeline 33. If the end portion 45b at the side of the first end 1a on the first upheaved part 45 is located as described above, the chips that are generated by the first cutting edge 35 and pass through between the pair of protrusions 43 may tend to be curved at the first upheaved part 45.

The upper end 45a of the first upheaved part 45 may be located above the second cutting edge 37 in the insert 1 of the non-limiting embodiment. In other words, the upper end 45a of the first upheaved part 45 may be located above the second cutting edge 37, and the upper end 45a of the first upheaved part 45 may be visible in a side view from a side of the second lateral surface 21 as in a non-limiting embodiment illustrated in FIG. 7.

If the first upheaved part 45 has the above configuration, chips generated by the second cutting edge 37 may tend to stably come into contact with the first upheaved part 45.

Consequently, the chips generated by the second cutting edge 37 may tend to be stably curled, thus leading to enhanced chip discharge performance.

The second cutting edge 37 may be inclined downward as going away from the first ridgeline 27, and the upper end 45a of the first upheaved part 45 may be located above the second cutting edge 37 as described above in the insert 1 of the non-limiting embodiment. This may facilitate to stably discharge chips respectively generated by the first cutting edge 35 and the second cutting edge 37.

The upper end portion of the first upheaved part 45 may be configured by a ridgeline formed by an intersection of two surface regions, or alternatively may be configured by a surface. That is, the first upheaved part 45 may include an upper end surface 47 as in the non-limiting embodiment illustrated in FIG. 5. The upper end surface 47 may denote one of surface regions forming a surface of the first upheaved part 45 which is located closest to the upper end.

If the first upheaved part 45 includes the upper end surface 47, the upper end surface 47 may be located away from the second ridgeline 29 as going away from the first ridgeline 27 in a top view of the first upheaved part 45. If the upper end surface 47 has the above configuration, chips generated by the second cutting edge 37 may tend to stably come into contact with the first upheaved part 45 at a part of the first upheaved part 45 which is close to the first end 1a. Additionally, it may be easy to ensure a large space where chips are generated by the second cutting edge 37 and the chips flow in a direction away from the first end 1a at a part of the first upheaved part 45 which is located away from the first end 1a. This may lead to further enhanced discharge performance of the chips generated by the second cutting edge 37.

The upper end of the upper end surface 47 may be located above the upper ends 43a of the pair of protrusions 43. A height of the upper end of the upper end surface 47 may be equal to a height of the upper end 43a of the pair of protrusions 43 as in the non-limiting embodiment illustrated in FIG. 7. The upper end of the upper end surface 47 may be a part of the upper end surface 47 which is located uppermost, and may correspond to the upper end 45a in the first upheaved part 45 in the non-limiting embodiment illustrated in FIG. 7. The upper ends 43a of the pair of protrusions 43 may correspond to a part of each of the protrusions 43 which is located uppermost.

If the upper ends 43a of the pair of protrusions 43 have the same height as the upper end 45a of the first upheaved part 45, chips may tend to be stably curved at both the protrusions 43 and the first upheaved part 45. This may lead to further enhanced chip discharge performance. The phrase that "the upper ends 43a of the pair of protrusions 43 have the same height as the upper end 45a of the first upheaved part 45" does not imply that both are strictly the same height. Even if a difference between a height from the lower surface 15 to the upper end 43a and a height from the lower surface 15 to the upper end 45a is approximately 0.05 mm, it may be regarded that both have the same height.

The upper end surface 47 may be inclined downward as going away from the first ridgeline 27 as in the non-limiting embodiment illustrated in FIG. 7. If the upper end surface 47 has the above configuration, the upper end portion of the first upheaved part 45 which is located at a side of the first end 1a may have a large height at a part of the first upheaved part 45 which is close to the first end 1a. Consequently, chips generated by the first cutting edge 35 may tend to stably come into contact with the first upheave part 45.

It may be easy to ensure a large space where chips are generated by the first cutting edge 35 and the chips flow in a direction away from the first end 1a at a part of the first upheaved part 45 which is located away from the first end 1a. This may lead to further enhanced discharge performance of the chips generated by the first cutting edge 35.

The upper end surface 47 and the second cutting edge 37 may be individually inclined downward as going away from the first ridgeline 27 as in the non-limiting embodiment illustrated in FIG. 7. The upper end surface 47 may be parallel to the second cutting edge 37 in a side view from a side of the second lateral surface 21.

If the upper end surface 47 has the above configuration, part of chips generated by the second cutting edge 37 may be less likely to be curved by the first upheaved part 45, and part of the chips generated by the second cutting edge 37 may be less likely to climb over the first upheaved part 45. Therefore, a chip flow may tend to become smooth, and chip clogging may be less likely to occur.

The first upheaved part 45 in the upper surface 17 may be in contact with the second ridgeline 29, or alternatively may be located away from the second ridgeline 29 as in the non-limiting embodiment illustrated in FIG. 6.

Figure 8:
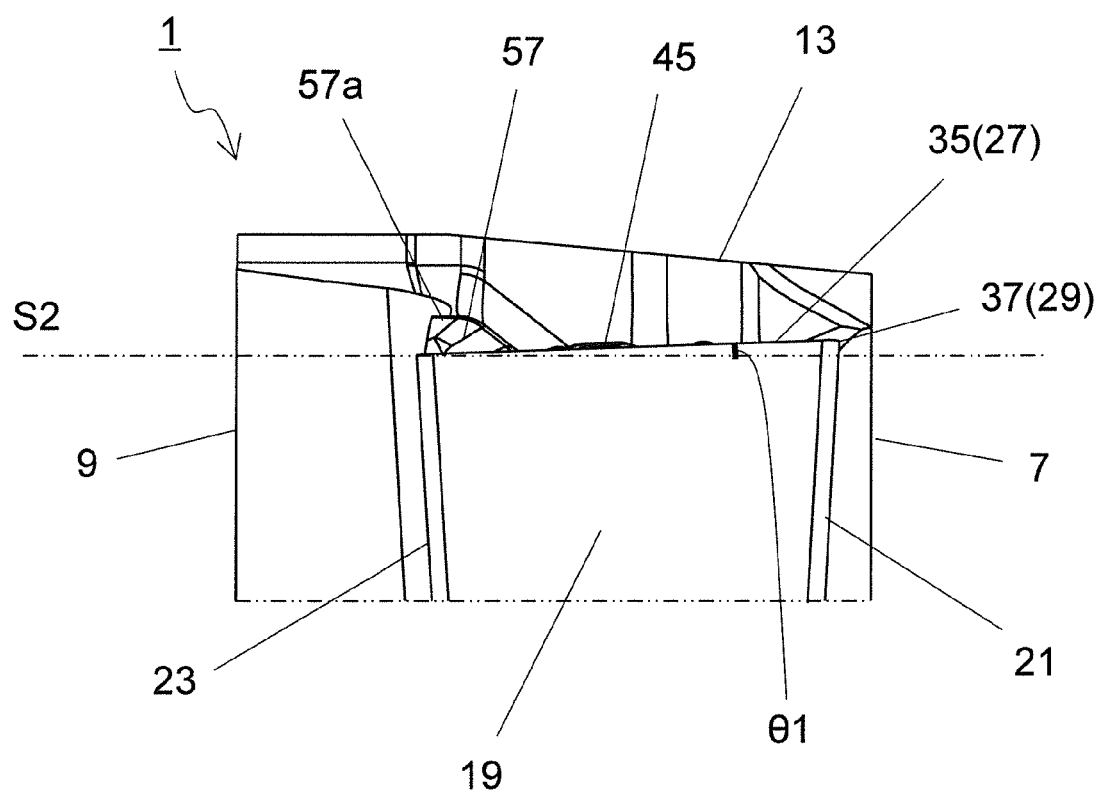
FIG. 8 is an enlarged view of a region B4 illustrated in FIG. 4.
Figure 9:
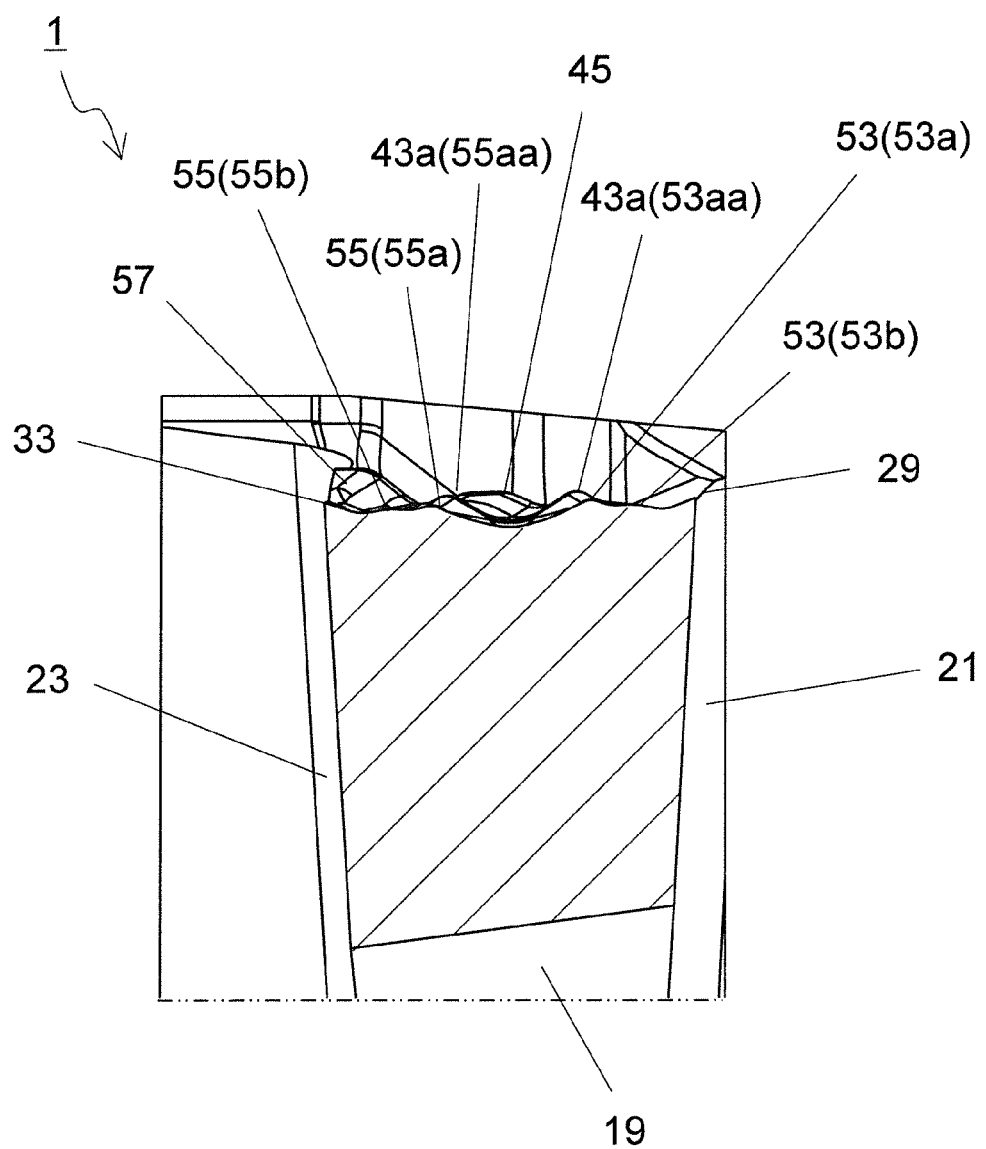
FIG. 9 is a cross-sectional view taken along the line IX-IX in the cutting insert illustrated in FIG. 2.
Figure 10:
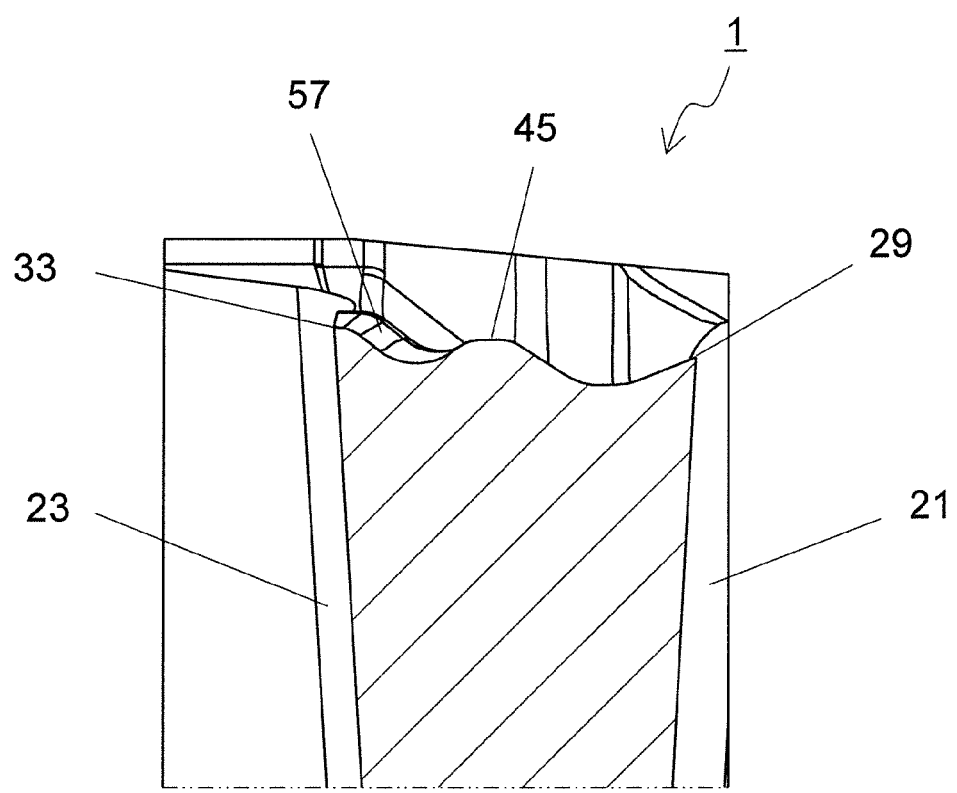
FIG. 10 is a cross-sectional view taken along the line X-X in the cutting insert illustrated in FIG. 2.
Figure 11:
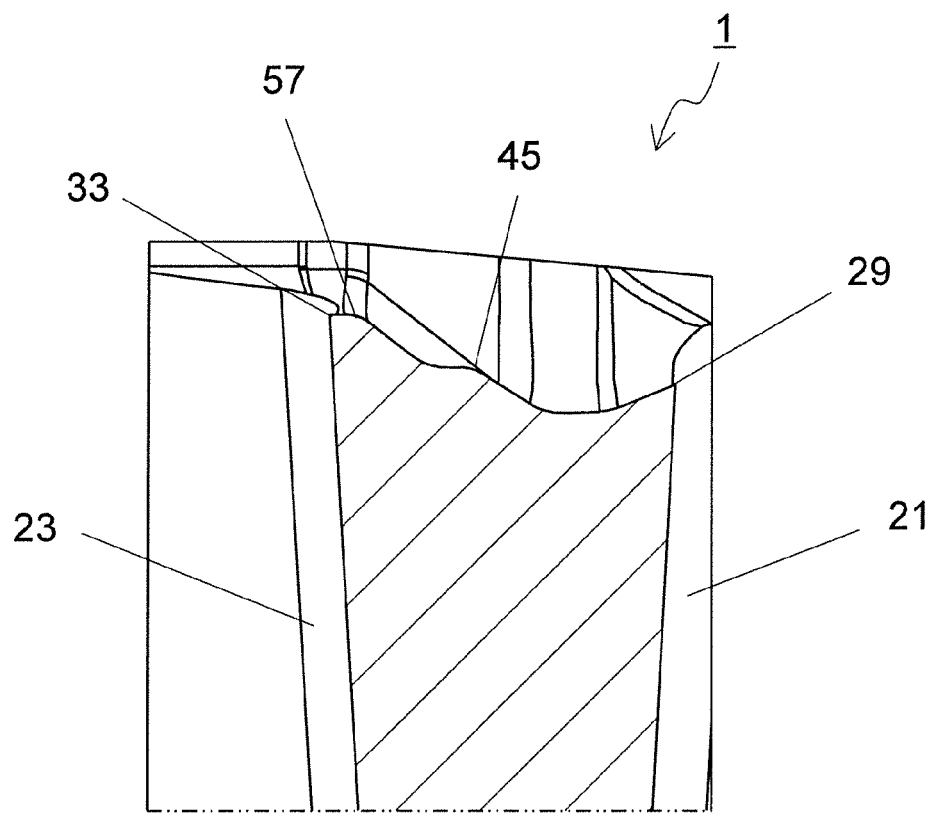
FIG. 11 is a cross-sectional view taken along the line XI-XI in the cutting insert illustrated in FIG. 2.
Figure 12:
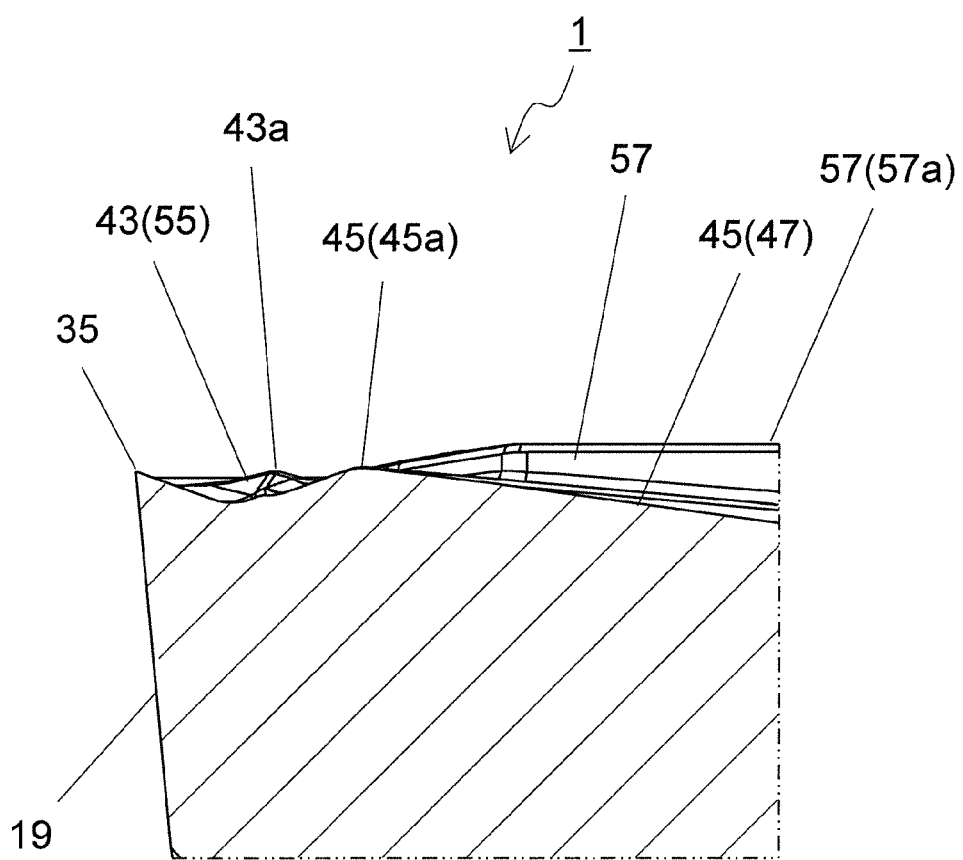
FIG. 12 is a cross-sectional view taken along the line XII-XII in the cutting insert illustrated in FIG. 6.

The first cutting edge 35 may have a constant height with respect to the lower side surface 15 without being inclined, or alternatively may be inclined downward as going away from the second ridgeline 29. The first cutting edge 35 may be inclined downward as going away from the second ridgeline 29 in a non-limiting embodiment illustrated in FIG. 8.

Hereinafter, an imaginary flat surface located at a middle of the upper side surface 13 and the lower side surface 15 may be a reference plane S1. As in the non-limiting embodiments illustrated in FIGS. 7 and 8, an imaginary plane parallel to the reference plane S1 may be a sub reference plane S2, an inclination angle of the first cutting edge 35 relative to the sub reference plane S2 in a side view from a side of the first lateral surface 19 may be a first inclination angle θ1, and an inclination angle of the second cutting edge 37 relative to the sub reference plane S2 in a side view from a side of the second lateral surface 21 may be a second inclination angle θ2. The first inclination angle θ1 may be smaller than the second inclination angle θ2.

If the first inclination angle θ1 and the second inclination angle θ2 have the above relationship, this may lead to high chip discharge performance. If the first inclination angle θ1 is relatively small, chips generated by the first cutting edge 35 may tend to flow toward the second end 1b. If the second inclination angle θ2 is relatively large, chips generated by the second cutting edge 37 may tend to flow toward the second end 1b. Thus, the chips respectively generated by the first cutting edge 35 and the second cutting edge 37 may tend to flow toward the second end 1b of the insert 1.

The upper surface 17 may include a first corner 49 and a second corner 51. The first corner 49 may be a corner located at an intersecting part of the first ridgeline 27 and the second ridgeline 29. The second corner 51 may be a corner located at an intersecting part of the first ridgeline 27 and the third ridgeline 33.

The first corner 49 and the second corner 51 need not be a strict corner. The first corner 49 and the second corner 51 may be a corner if taking a broad view thereof, and may have a convex curvilinear shape if taking a microscopic view thereof as in the non-limiting embodiment illustrated in FIG. 6.

The pair of protrusions 43 may include a first protrusion 53 located on a corner bisector L1 of the first corner 49 and a second protrusion 55 located on a corner bisector L2 of the second corner 51 in a top view of the protrusions 43. For example, one of the protrusions 43 may be the first protrusion 53 and the other may be the second protrusion 55 in the non-limiting embodiment illustrated in FIG. 6.

If the pair of protrusions 43 includes the first protrusion 53 located on the corner bisector L1 of the first corner 49, chips generated by the first cutting edge 35 may be less likely to collide with chips generated by the second cutting edge 37, and chip clogging may therefore be less likely to occur. This may lead to enhanced chip discharge performance. If the pair of protrusions 43 includes the second protrusion 55 located on the corner bisector L2 of the second corner 51, the chips generated by the first cutting edge 35 may be less likely to collide with chips generated by the third cutting edge 39, and chip clogging may therefore be less likely to occur. This may lead to the enhanced chip discharge performance.

In cases where the pair of protrusions 43 includes the first protrusion 53, the first protrusion 53 may include a first front protrusion 53a and a first lateral protrusion 53b. The first front protrusion 53a may be located at a side approximately closer to the first ridgeline 27 than the corner bisector L1 of the first corner 49, and may be extended toward the first ridgeline 27 in a top view as in the non-limiting embodiment illustrated in FIG. 6.

The first lateral protrusion 53b may be located at a side approximately closer to the second ridgeline 29 than the corner bisector L1 of the first corner 49, and may be extended toward the second ridgeline 29 in the top view as in the non-limiting embodiment illustrated in FIG. 6.

If the first protrusion 53 includes the first front protrusion 53a, the chips generated by the first cutting edge 35 may tend to be curved by the first front protrusion 53a if viewed from a direction orthogonal to the first cutting edge 35. This may facilitate to stabilize a flow direction of the chips generated by the first cutting edge 35. If the first protrusion 53 includes the first lateral protrusion 53b, the chips generated by the second cutting edge 37 may tend to be curved by the first lateral protrusion 53b if viewed from a direction orthogonal to the second cutting edge 37. This may facilitate to stabilize a flow direction of the chips generated by the second cutting edge 37.

If the first protrusion 53 includes the first front protrusion 53a and the first lateral protrusion 53b, it may be possible to stably curve the chips generated by the first cutting edge 35 and the chips generated by the second cutting edge 37. Enhanced chip discharge performance may be attainable in a cutting process mainly using either one of the first cutting edge 35 and the second cutting edge 37. Therefore, if the first protrusion 53 includes the first front protrusion 53a and the first lateral protrusion 53b, the insert 1 may be highly versatile to carry out cutting processes.

Figure 13:
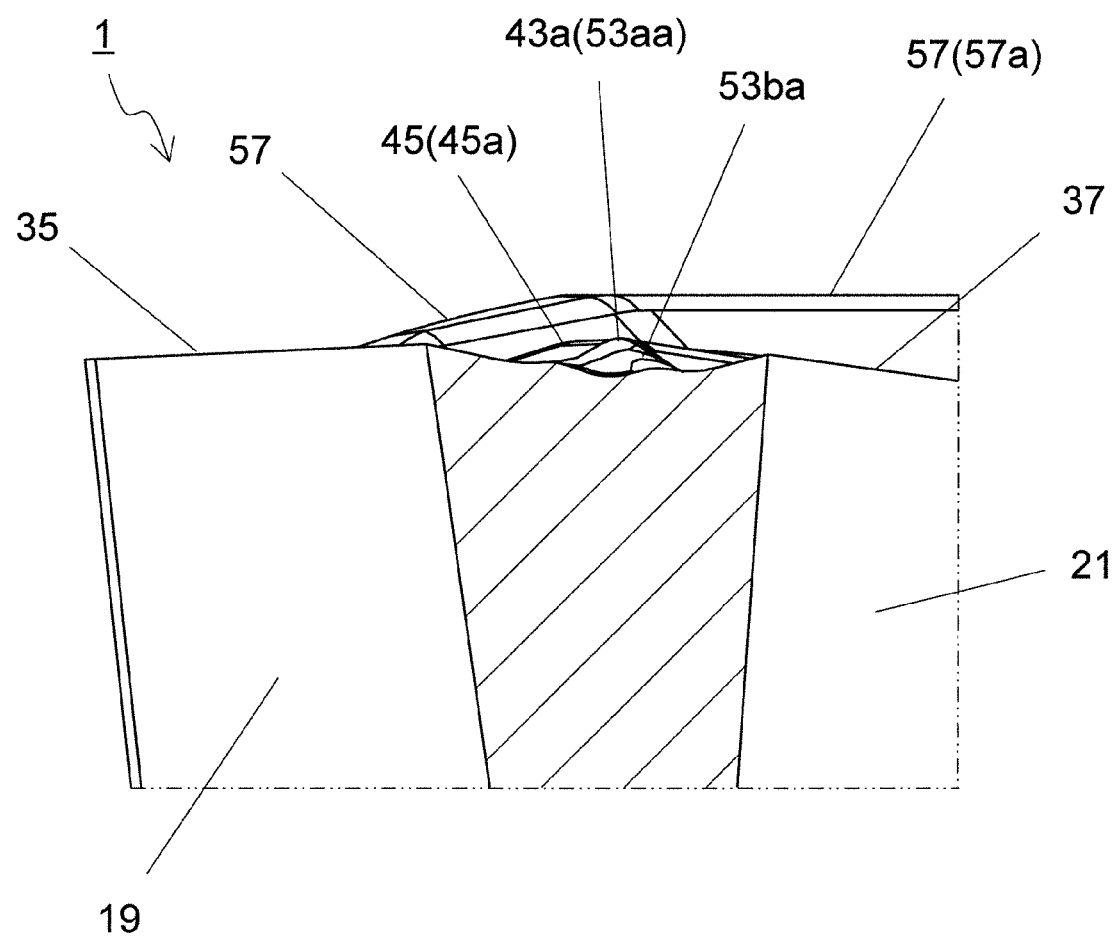
FIG. 13 is a cross-sectional view taken along the line XIII-XIII in the cutting insert illustrated in FIG. 6.

In cases where the first protrusion 53 includes the first front protrusion 53a and the first lateral protrusion 53b, no particular limitation is imposed on height of the first front protrusion 53a and the first lateral protrusion 53b. For example, an upper end 53aa of the first front protrusion 53a may be located above an upper end 53ba of the first lateral protrusion 53b as in a non-limiting embodiment illustrated in FIG. 13. If the first front protrusion 53a and the first lateral protrusion 53b have the above configuration, further enhanced chip discharge performance may be attainable.

For example, if the upper end 53aa of the first front protrusion 53a is located above the upper end 53ba of the first lateral protrusion 53b, chips that are generated by the first cutting edge 35 and flow on the first front protrusion 53a may tend to climb over the first lateral protrusion 53b. Accordingly, the chips generated by the first cutting edge 35 may tend to flow toward the second end 1b.

If the upper end 53aa of the first front protrusion 53a is located above the upper end 53ba of the first lateral protrusion 53b, chips that are generated the second cutting edge 37 and flow on the first lateral protrusion 53b may tend to come into contact with the first front protrusion 53a. Because the chips generated by the second cutting edge 37 come into contact with the first front protrusion 53a, it may be avoidable that the chips generated by the second cutting edge 37 excessively flow to a side opposite to the second lateral surface 21, namely, to a side of the third lateral surface 23. These chips may therefore be likely to be discharged toward the second end 1b.

In cases where the pair of protrusions 43 includes the second protrusion 55, the second protrusion 55 may include a second front protrusion 55a and a second lateral protrusion 55b. The second front protrusion 55a may be located at a side approximately closer to the first ridgeline 27 than the corner bisector L2 of the second corner 51, and may be extended toward the first ridgeline 27 in the top view as in the non-limiting embodiment illustrated in FIG. 6.

The second lateral protrusion 55b may be located at a side approximately closer to the third ridgeline 33 than the corner bisector L2 of the second corner 51, and may be extended toward the third ridgeline 33 in a top view as in the non-limiting embodiment illustrated in FIG. 6.

If the second protrusion 55 includes the second front protrusion 55a, the chips generated by the first cutting edge 35 may tend to be curved by the second front protrusion 55a if viewed from the direction orthogonal to the first cutting edge 35. This may facilitate to stabilize the flow direction of the chips generated by the first cutting edge 35. If the second protrusion 55 includes the second lateral protrusion 55b, the chips generated by the third cutting edge 39 may tend to be curved by the second lateral protrusion 55b if viewed from a direction orthogonal to the third cutting edge 39. This may facilitate to stabilize a flow direction of the chips generated by the third cutting edge 39.

If the second protrusion 55 includes the second front protrusion 55a and the second lateral protrusion 55b, it may be possible to stably curve the chips generated by the first cutting edge 35 and the chips generated by the third cutting edge 39. Hence, enhanced chip discharge performance may be attainable in a cutting process mainly using either one of the first cutting edge 35 and the third cutting edge 39. Thus, if the second protrusion 55 includes the second front protrusion 55a and the second lateral protrusion 55b, the insert 1 may be highly versatile to carry out cutting processes.

Figure 14:
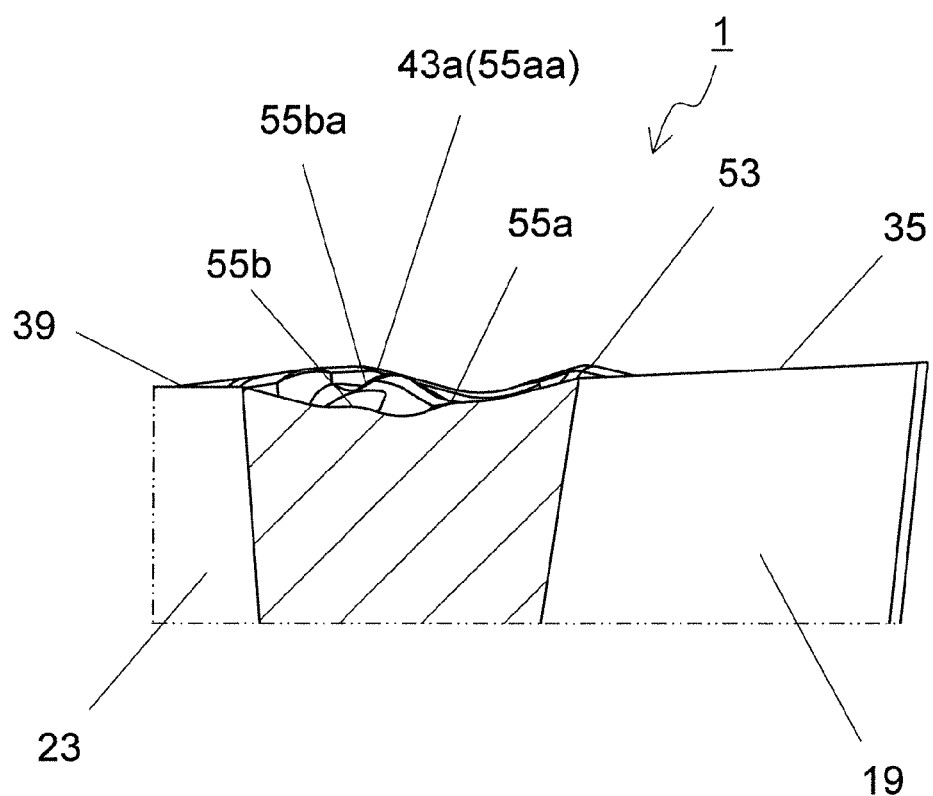
FIG. 14 is a cross-sectional view taken along the line XIV-XIV in the cutting insert illustrated in FIG. 6.

In cases where the second protrusion 55 includes the second front protrusion 55a and the second lateral protrusion 55b, no particular limitation is imposed on height of the second front protrusion 55a and the second lateral protrusion 55b. For example, an upper end 55aa of the second front protrusion 55a may be located above an upper end 55ba of the second lateral protrusion 55b as in a non-limiting embodiment illustrated in FIG. 14. If the second front protrusion 55a and the second lateral protrusion 55b have the above configuration, further enhanced chip discharge performance may be attainable.

For example, if the upper end 55aa of the second front protrusion 55a is located above the upper end 53ba of the second lateral protrusion 55b, chips that are generated by the first cutting edge 35 and flow on the second front protrusion 55a may tend to climb over the second lateral protrusion 55b. Accordingly, the chips generated by the first cutting edge 35 may tend to flow toward the second end 1b.

If the upper end 55aa of the second front protrusion 55a is located above the upper end 55ba of the second lateral protrusion 55b, chips that are generated the third cutting edge 39 and flow on the second lateral protrusion 55b may tend to come into contact with the second front protrusion 55a. Because the chips generated by the third cutting edge 39 come into contact with the second front protrusion 55a, it may be avoidable that the chips generated by the third cutting edge 39 excessively flow to a side opposite to the third lateral surface 23, namely, to a side of the second lateral surface 21. These chips may therefore be likely to be discharged toward the second end 1b.

The upper surface 17 may further include a second upheaved part 57 located along the third ridgeline 33 in between the first upheaved part 45 and the third ridgeline 33 in a top view. In cases where the upper surface 17 includes the second upheaved part 57 as in the non-limiting embodiment illustrated in FIG. 5, even if chips generated by the second cutting edge 37 climb over the first upheaved part 45, the chips can be curved at the second upheaved part 57. This may lead to the enhanced chip discharge performance.

In particular, if the upper end 57a of the second upheaved part 57 is located above the upper end 45a of the first upheaved part 45, the chips can be stably curved at the second upheaved part 57. This may lead to further enhanced chip discharge performance.

If cases where the upper surface 17 includes the second upheaved part 57 as in the non-limiting embodiment illustrated in FIG. 6, the end portion 57b at a side of the first end 1a on the second upheaved part 57 may be located further away from the first ridgeline 27 than the end portion 45b at a side of the first end 1a on the first upheaved part 45. If the upheaved part 45 and the second upheaved part 57 are located as described above, the chips generated by the third cutting edge 39 may tend to stably come into contact with the first upheaved part 45.

If the upper surface 17 includes the second upheaved part 57, the second upheaved part 57 may be in contact with or away from the third ridgeline 33 as in the non-limiting embodiment illustrated in FIG. 6.

For example, inorganic materials, such as cemented carbide, cermet and ceramics, may be usable as a material of the insert 1. Examples of composition of the cemented carbide may include WC(tungsten carbide)-Co, WC—TiC(titanium carbide)-Co and WC—TiC—TaC(tantalum carbide)-Co, in which WC, TiC and TaC may be hard particles and Co may be a binding phase. The cermet may be a sintered composite material obtainable by compositing metal into a ceramic component. Examples of the cermet may include compounds composed mainly of TiC or TiN(titanium nitride). The material of the insert 1 is not limited to the above materials.

Alternatively, the insert 1 may be configured to include a main body including the above material, and a coating layer that covers the main body. Examples of material of the coating layer may include carbides, nitrides, oxides, oxocarbons, nitrogen oxides, carbonitrides and carboxynitrides of titanium. The coating layer may include one or a plurality of the above materials. The coating layer may be formed by one or a plurality of layers laminated one upon another. The material of the coating layer is not limited to the above materials.

The coating layer can be located on a base member by using chemical vapor deposition (CVD) method or physical vapor deposition (PVD) method. For example, in cases where the coating layer is formed by the above vapor deposition method in a state where the base member is held by an inner peripheral surface of the through hole 11, the coating layer can be located so as to cover the whole of the surface of the base member except for the inner peripheral surface of the through hole 11.

<Cutting Tools>

A cutting tool 101 in non-limiting embodiments may be described below with reference to the drawings.

Figure 15:
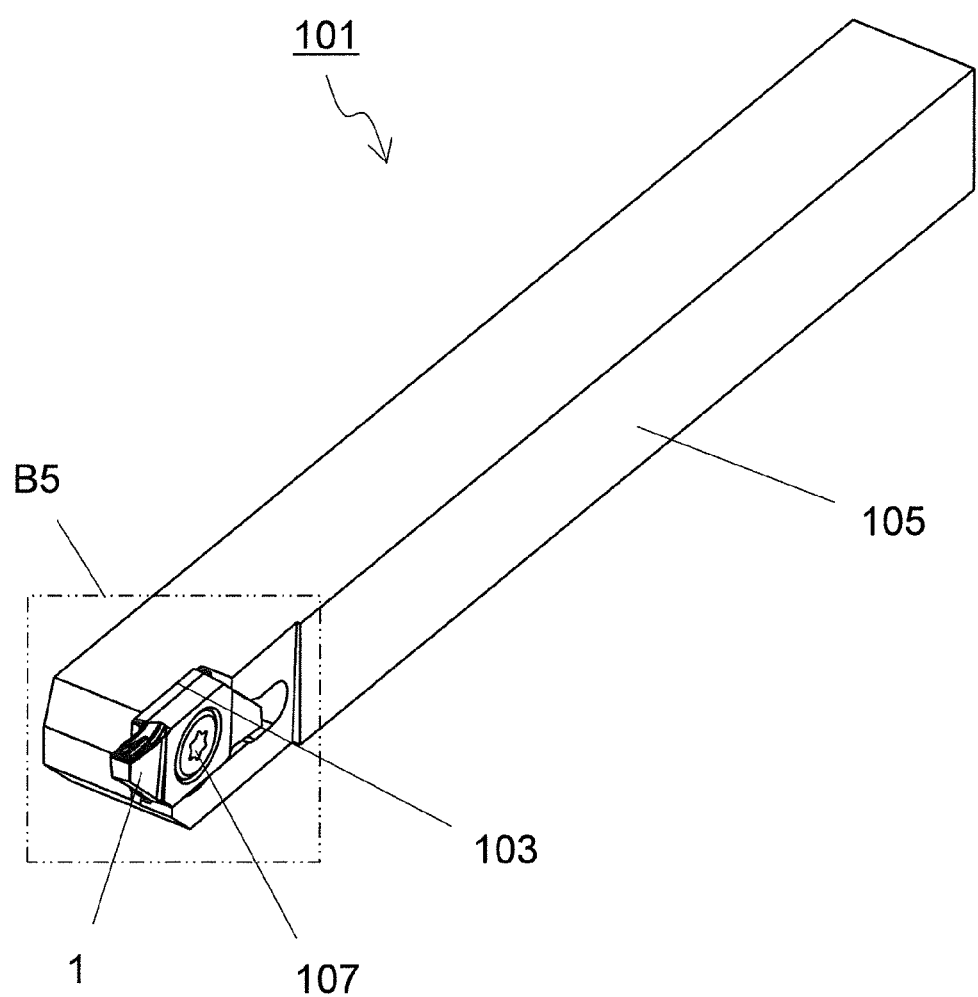
FIG. 15 is a perspective view of a cutting tool in non-limiting aspects of the present disclosure.
Figure 16:
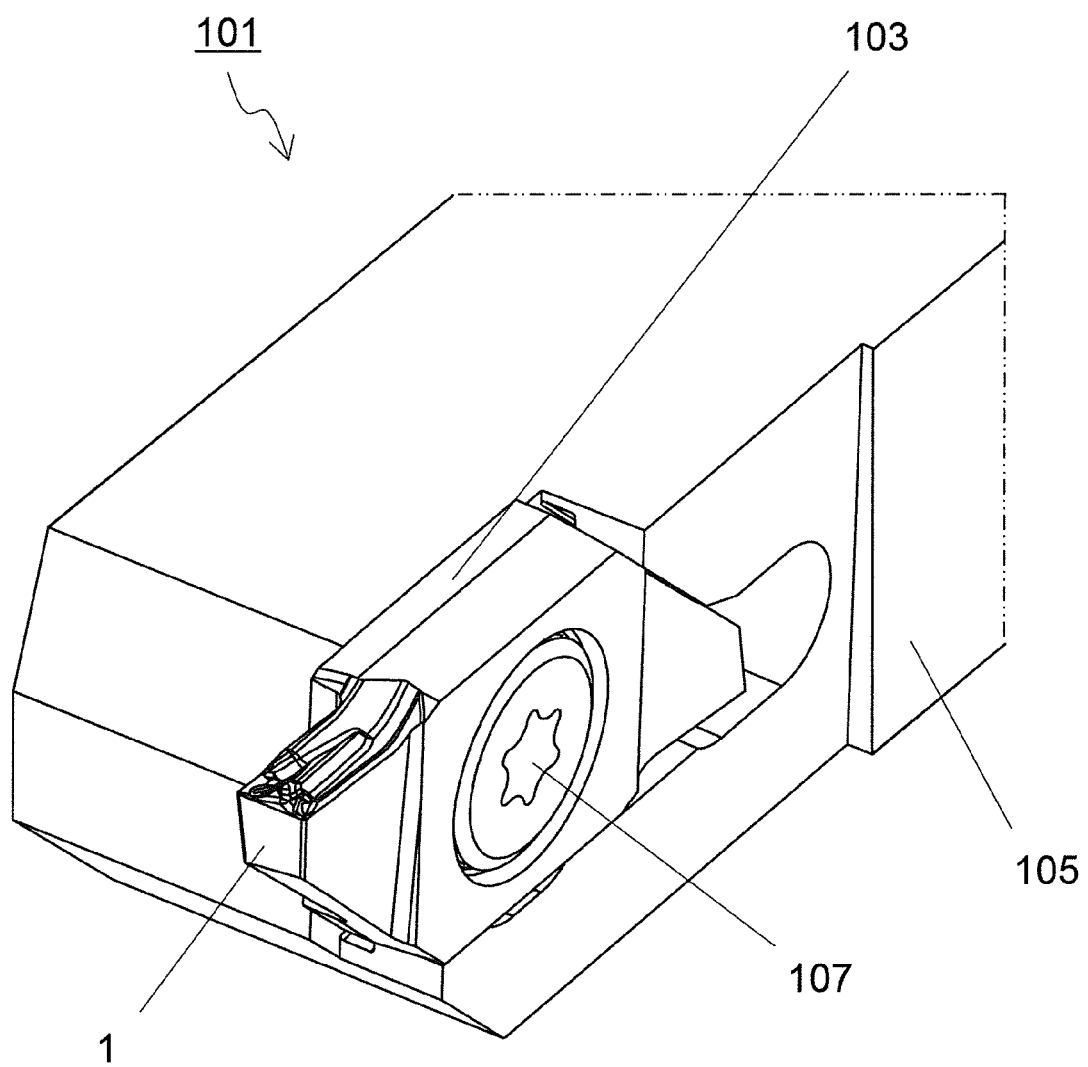
FIG. 16 is an enlarged view of a region B5 illustrated in FIG. 15.

As illustrated in FIG. 15, the cutting tool 101 of the non-limiting embodiments may be a bar shaped body extended from a front end (lower left end in FIG. 15) to a rear end (upper right end in FIG. 15). The cutting tool 101 may include a holder 105 including a pocket 103 located at a side of the front end, and the above insert 1 located in the pocket 103.

The pocket 103 may be a part that permits attachment of the insert 1. The pocket 103 may include a seating surface parallel to a second main surface of the holder 105, and a constraining lateral surface inclined relative to the seating surface. The pocket 103 may open into a side of a front end of the holder 105.

The insert 1 may be located in the pocket 103. A base of the insert 1 may be directly contacted with the pocket 103. Alternatively, a sheet may be interposed between the insert 1 and the pocket 103.

The insert 1 may be attached so that at least a part of a region of the cutting part which is used as the cutting edge is protruded outward from the holder 105. The insert 1 may be attached to the holder 105 by a screw 107 in the non-limiting embodiments.

For example, steel or cast iron may be used as a material of the holder 105. Of these materials, the use of steel particularly may contribute to enhancing toughness of the holder 105.

A cutting tool for use in a so-called turning process may be illustrated in the non-limiting embodiment illustrated in FIG. 15. The cutting tool 101 in the non-limiting embodiments may be usable for a grooving process, but the use thereof is not limited thereto. There is no problem even if the cutting tool 101 is used for an inner diameter process, outer diameter process and traversing process.

<Method for Manufacturing Machined Product>

A method for manufacturing a machined product in non-limiting embodiments may be described below with reference to the drawings.

The machined product may be manufacturable by carrying out the cutting process of the workpiece 201. The method for manufacturing the machined product in the non-limiting embodiments of the present disclosure may include the following steps:

(1) rotating the workpiece 201;

(2) bringing the cutting tool 101 represented by the above embodiment into contact with the workpiece 201 being rotated; and (3) moving the cutting tool 101 away from the workpiece 201.

Figure 17:
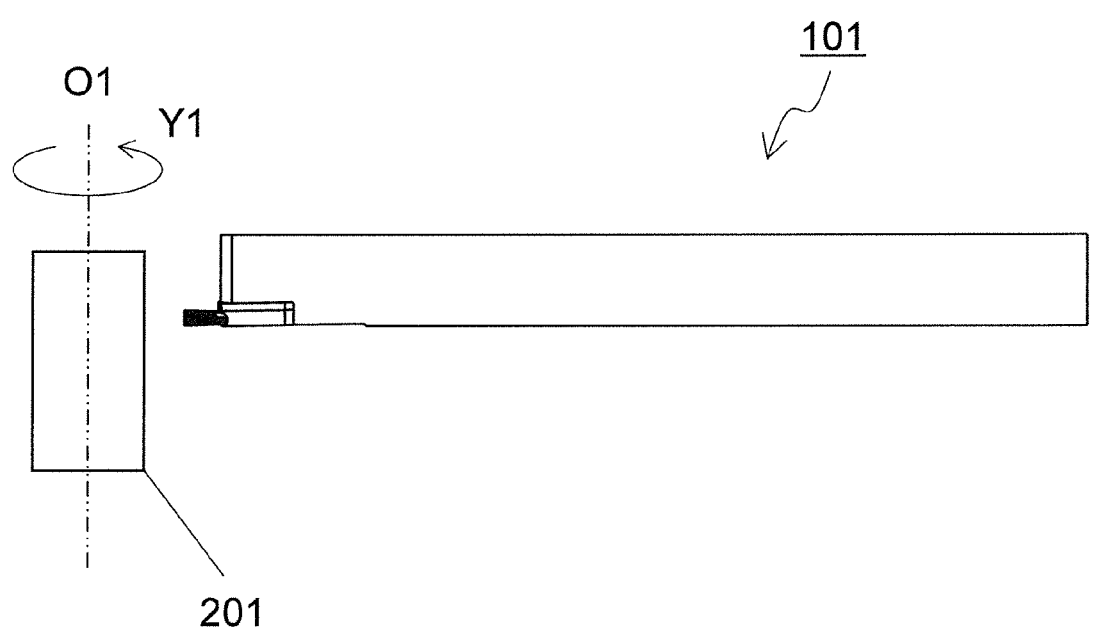
FIG. 17 is a schematic diagram illustrating one of steps in a method for manufacturing a machined product in non-limiting aspects of the present disclosure.
Figure 18:
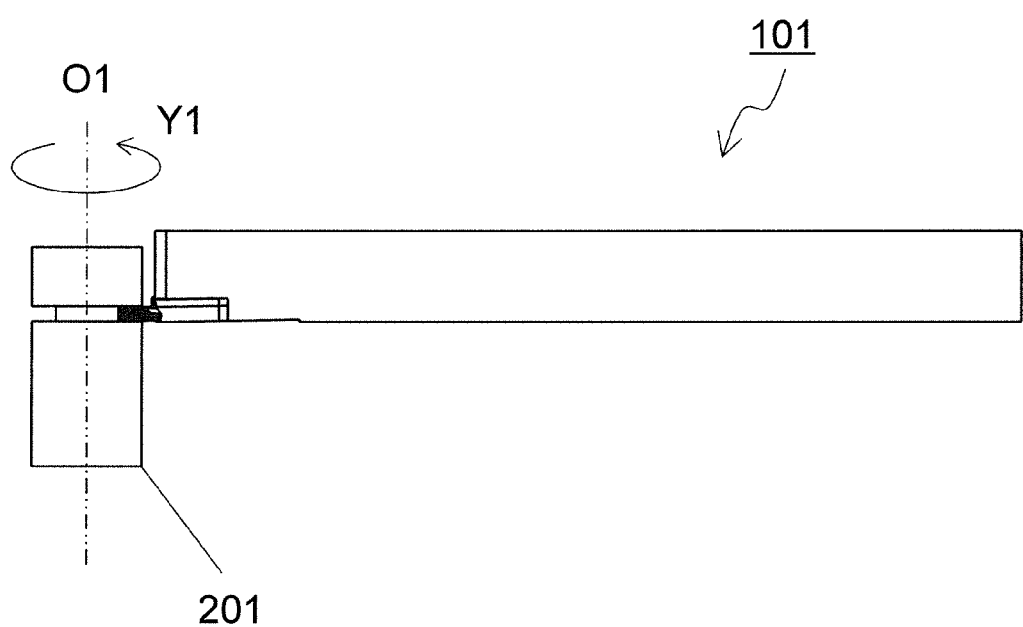
FIG. 18 is a schematic diagram illustrating one of the steps in the method for manufacturing a machined product in the non-limiting aspects of the present disclosure.
Figure 19:
Figure 20:
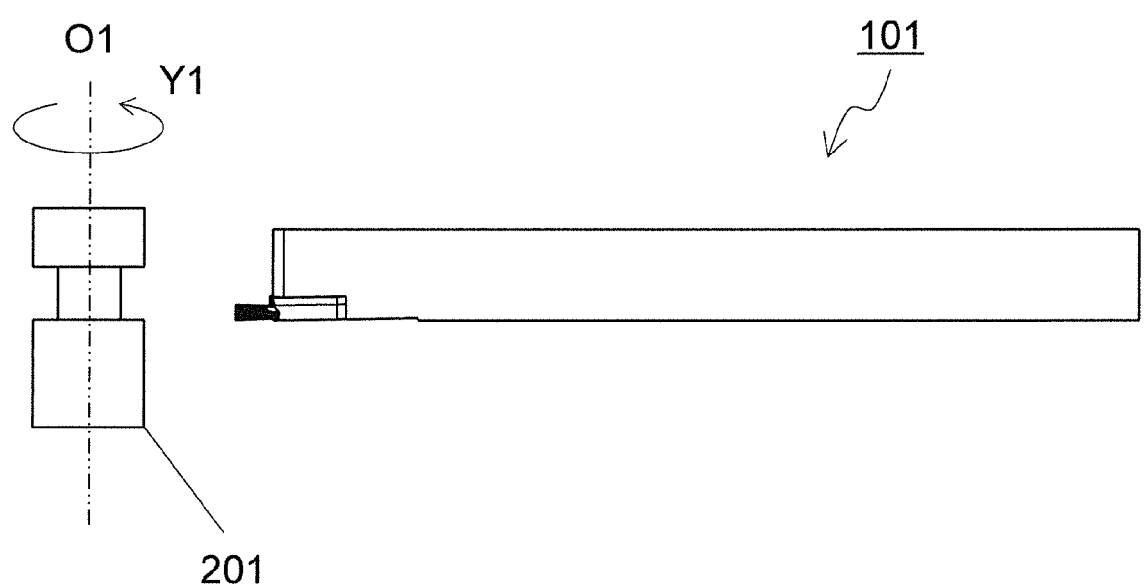
FIG. 20 is a schematic diagram illustrating one of the steps in the method for manufacturing a machined product in the non-limiting aspects of the present disclosure.

More specifically, firstly, the cutting tool 101 may be relatively brought near the workpiece 201 while rotating the workpiece 201 around an axis O1 as illustrated in FIG. 17. The workpiece 201 may be then cut out by bringing the ridgeline (cutting edge) in the cutting tool 101 into contact with the workpiece 201 as illustrated in FIGS. 18 and 19. Thereafter, the cutting tool may be relatively moved away from the workpiece 201 as illustrated in FIG. 20.

In FIG. 17, the cutting tool 101 may be brought near the workpiece 201 by moving the cutting tool 101 in a Y1 direction in a state where the axis O1 is fixed and the workpiece 201 is rotated around the axis O1. In FIGS. 18 and 19, the workpiece 201 may be cut out by bringing the cutting edge in the insert 1 into contact with the workpiece 201 being rotated. In FIG. 20, the cutting tool 101 may be moved away by moving the cutting tool 101 in a Y2 direction in a state where the workpiece 201 is rotated.

During the cutting process with the manufacturing method in the non-limiting embodiments, the cutting tool 101 may be brought into contact with the workpiece 201, or the cutting tool 101 may be moved away from the workpiece 201 by moving the cutting tool 101 in the individual steps. However, it is not intended to limit to this embodiment.

For example, the workpiece 201 may be brought near the cutting tool 101 in the step (1). Similarly, the workpiece 201 may be moved away from the cutting tool 101 in the step (3). If desired to continue the cutting process, the step of bringing the cutting edge in the insert 1 into contact with different portions of the workpiece 201 may be repeated while keeping the workpiece 201 rotated.

Representative examples of material of the workpiece 201 may include carbon steel, alloy steel, stainless steel, cast iron and nonferrous metals.

DESCRIPTION OF THE REFERENCE NUMERAL 1 insert
3 base
5 cutting part
7 first main surface
9 second main surface
11 through hole
13 upper side surface
15 lower side surface
17 upper surface
19 first lateral surface
21 second lateral surface
23 third lateral surface
25 lower surface
27 first ridgeline
29 second ridgeline
33 third ridgeline
25 first cutting edge
37 second cutting edge
39 third cutting edge
41 first inclined surface
43 pair of protrusions
43a upper end
45 first upheaved part
45a upper end
45b end portion
47 upper end surface
49 first corner
51 second corner
53 first protrusion
53a first front protrusion
53aa upper end
53b first lateral protrusion
53ba upper end
55 second protrusion
55a second front protrusion
55aa upper end
55b second lateral protrusion
55ba upper end
57 second upheaved part
57a upper end
57b end portion
101 cutting tool
103 pocket
105 holder
107 screw
201 workpiece

The invention claimed is:

1. A cutting insert, comprising:
a base comprising an upper side surface and a lower side surface; and
a cutting part protruded from the base toward a first end, the cutting part comprises
an upper surface extended from the upper side surface toward the first end,
a first lateral surface which is located at a side of the first end and adjacent to the upper surface,
a second lateral surface adjacent to the first lateral surface and the upper surface,
a third lateral surface which is adjacent to the first lateral surface and the upper surface and which is located at a side opposite to the second lateral surface,
a first ridgeline located on an intersection of the upper surface and the first lateral surface,
a second ridgeline located on an intersection of the upper surface and the second lateral surface,
a third ridgeline located on an intersection of the upper surface and the third lateral surface,
a first cutting edge located on the first ridgeline, and
a second cutting edge located on the second ridgeline, the upper surface comprises
a first inclined surface located along the first ridgeline and inclined downward as going away from the first ridgeline,
a pair of protrusions located side by side in a direction along the first ridgeline on the first inclined surface, and
a first upheaved part located along the third ridgeline at a side further away from the first ridgeline than the pair of protrusions,
the second cutting edge is inclined downward as going away from the first ridgeline, and
an upper end of the first upheaved part is located above the second cutting edge and
the first cutting edge is inclined downward as going away from the second ridgeline and
an imaginary flat surface located at a middle of the upper side surface and the lower side surface is a reference plane, and
an inclination angle of the first cutting edge relative to the reference plane in a side view from a side of the first lateral surface is smaller than an inclination angle of the second cutting edge relative to the reference plane in a side view from a side of the second lateral surface.

2. The cutting insert according to claim 1, wherein the first upheaved part is located away from the third ridgeline.

3. The cutting insert according to claim 1, wherein
the first upheaved part comprises an upper end surface, and
the upper end surface is located away from the second ridgeline as going away from the first ridgeline in a top view.

4. The cutting insert according to claim 3, wherein a height of an upper end of the upper end surface is equal to a height of an upper end of the pair of protrusions.

5. The cutting insert according to claim 3, wherein
the upper end surface is inclined downward as going away from the first ridgeline, and the upper end surface is parallel to the second cutting edge in a side view from a side of the second lateral surface.

6. The cutting insert according to claim 1, wherein the upper surface further comprises
a first corner located at a corner where the first ridgeline intersects with second ridgeline, and
a second corner located at a corner where the first ridgeline intersects with the third ridgeline, and
in a top view, the pair of protrusions comprise
a first protrusion located on a corner bisector of the first corner, and
a second protrusion located on a corner bisector of the second corner.

7. The cutting insert according to claim 6, wherein, in the top view, the first protrusion comprises
a first front protrusion which is located closer to the first ridgeline than the corner bisector of the first corner and which is extended toward the first ridgeline, and
a first lateral protrusion which is located closer to the second ridgeline than the corner bisector of the first corner and which is extended toward the second ridgeline.

8. The cutting insert according to claim 7, wherein an upper end of the first front protrusion is located above an upper end of the first lateral protrusion.

9. The cutting insert according to claim 7, wherein, in the top view, the second protrusion comprises
a second front protrusion which is located closer to the first ridgeline than the corner bisector of the second corner and which is extended toward the first ridgeline, and
a second lateral protrusion which is located closer to the third ridgeline than the corner bisector of the second corner and which is extended toward the third ridgeline, and
an upper end of the second lateral protrusion is located above an upper end of the first lateral protrusion.

10. The cutting insert according to claim 1, wherein
the upper surface further comprises a second upheaved part located along the third ridgeline in between the first upheaved part and the third ridgeline in a top view, and
an upper end of the second upheaved part is located above the upper end of the first upheaved part.

11. The cutting insert according to claim 10, wherein
an end portion at a side of the first end on the second upheaved part is located further away from the first ridgeline than an end portion at a side of the first end on the first upheaved part.

12. A cutting tool, comprising:
a holder comprising a pocket located at a side of a front end of the holder; and
the cutting insert according to claim 1, the cutting insert being located in the pocket.

13. A method for manufacturing a machined product, comprising:
rotating a workpiece;
bringing the cutting tool according to claim 12 into contact with the workpiece being rotated; and
moving the cutting tool away from the workpiece.

14. A cutting insert, comprising:
a base comprising an upper side surface and a lower side surface; and
a cutting part protruded from the base toward a first end, the cutting part comprises
an upper surface extended from the upper side surface toward the first end,
a first lateral surface which is located at a side of the first end and adjacent to the upper surface,
a second lateral surface adjacent to the first lateral surface and the upper surface,
a third lateral surface which is adjacent to the first lateral surface and the upper surface and which is located at a side opposite to the second lateral surface,
a first ridgeline located on an intersection of the upper surface and the first lateral surface,
a second ridgeline located on an intersection of the upper surface and the second lateral surface,
a third ridgeline located on an intersection of the upper surface and the third lateral surface,
a first cutting edge located on the first ridgeline, and
a second cutting edge located on the second ridgeline, the upper surface comprises
a first inclined surface located along the first ridgeline and inclined downward as going away from the first ridgeline,
a pair of protrusions located side by side in a direction along the first ridgeline on the first inclined surface, and
a first upheaved part located along the third ridgeline at a side further away from the first ridgeline than the pair of protrusions,
the second cutting edge is inclined downward as going away from the first ridgeline, and
an upper end of the first upheaved part is located above the second cutting edge and
the upper surface further comprises
a first corner located at a corner where the first ridgeline intersects with second ridgeline, and
a second corner located at a corner where the first ridgeline intersects with the third ridgeline, and
in a top view, the pair of protrusions comprise:
a first protrusion located on a corner bisector of the first corner, and
a second protrusion located on a corner bisector of the second corner.

15. The cutting insert according to claim 14, wherein, in the top view, the first protrusion comprises
a first front protrusion which is located closer to the first ridgeline than the corner bisector of the first corner and which is extended toward the first ridgeline, and
a first lateral protrusion which is located closer to the second ridgeline than the corner bisector of the first corner and which is extended toward the second ridgeline.

16. A cutting tool, comprising:
a holder comprising a pocket located at a side of a front end of the holder; and
the cutting insert according to claim 14, the cutting insert being located in the pocket.

17. A method for manufacturing a machined product, comprising:
rotating a workpiece;
bringing the cutting tool according to claim 16 into contact with the workpiece being rotated; and
moving the cutting tool away from the workpiece.

18. A cutting insert, comprising:
a base comprising an upper side surface and a lower side surface; and
a cutting part protruded from the base toward a first end, the cutting part comprises
an upper surface extended from the upper side surface toward the first end,
a first lateral surface which is located at a side of the first end and adjacent to the upper surface,
a second lateral surface adjacent to the first lateral surface and the upper surface,
a third lateral surface which is adjacent to the first lateral surface and the upper surface and which is located at a side opposite to the second lateral surface, a first ridgeline located on an intersection of the upper surface and the first lateral surface,
a second ridgeline located on an intersection of the upper surface and the second lateral surface,
a third ridgeline located on an intersection of the upper surface and the third lateral surface,
a first cutting edge located on the first ridgeline, and
a second cutting edge located on the second ridgeline, the upper surface comprises
a first inclined surface located along the first ridgeline and inclined downward as going away from the first ridgeline,
a pair of protrusions located side by side in a direction along the first ridgeline on the first inclined surface, and
a first upheaved part located along the third ridgeline at a side further away from the first ridgeline than the pair of protrusions,
the second cutting edge is inclined downward as going away from the first ridgeline, and
an upper end of the first upheaved part is located above the second cutting edge and
the upper surface further comprises a second upheaved part located along the third ridgeline in between the first upheaved part and the third ridgeline in a top view, and
an upper end of the second upheaved part is located above the upper end of the first upheaved part.

\* \* \* \* \*